United States Patent
Akatsu et al.

(10) Patent No.: US 6,671,730 B1
(45) Date of Patent: Dec. 30, 2003

(54) DATA GATEWAY UNIT AND DATA GATEWAY METHOD

(75) Inventors: Shinji Akatsu, Tokyo (JP); Shin Miura, Tokyo (JP); Hiroshi Kawawata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,031

(22) Filed: May 8, 2000

(30) Foreign Application Priority Data

May 21, 1999 (JP) ............................................ 11-142488

(51) Int. Cl.$^7$ .............................................. G06F 15/16
(52) U.S. Cl. ...................... 709/228; 709/227; 709/223; 709/224
(58) Field of Search ................................ 709/227, 228, 709/220, 223, 224, 217, 219, 200, 201, 202, 203

(56) References Cited

U.S. PATENT DOCUMENTS

| | | | | |
|---|---|---|---|---|
| 5,845,081 A | * | 12/1998 | Rangarajan et al. | 709/224 |
| 6,012,100 A | * | 1/2000 | Frailong et al. | 709/250 |
| 6,085,236 A | * | 7/2000 | Lea | 709/220 |
| 6,360,267 B1 | * | 3/2002 | Kakiuchi et al. | 709/227 |
| 6,480,889 B1 | * | 11/2002 | Saito et al. | 709/220 |
| 6,523,064 B1 | * | 2/2003 | Akatsu et al. | 709/226 |
| 6,523,696 B1 | * | 2/2003 | Saito et al. | 709/223 |
| 6,546,419 B1 | * | 4/2003 | Humpleman et al. | 709/223 |

FOREIGN PATENT DOCUMENTS

| | | |
|---|---|---|
| JP | A767186 | 3/1995 |
| JP | A7123452 | 5/1995 |

* cited by examiner

*Primary Examiner*—Krisna Lim
*Assistant Examiner*—Mareisha N. Winters
(74) *Attorney, Agent, or Firm*—Birch, Stewart, Kolasch & Birch, LLP

(57) ABSTRACT

A data gateway unit includes a configuration information update unit for examining a connection state of a terminal on a customer premise network side, and for updating configuration information on the customer premise network; a service menu unit for enumerating, in response to the configuration information on the customer premise network which the configuration information update unit updates, available services the terminal on the customer premise network side can implement; and a service presentation and selection unit for notifying a user of the available services the service menu unit enumerates, and for accepting a service selected by the user. This can solve a problem of a conventional data gateway unit in that users unfamiliar with a personal computer, home bus, or system information, cannot change the setup of the system easily because of the difficulty to create the system information.

9 Claims, 14 Drawing Sheets

FIG.3

CUSTOMER PREMISE NETWORK CONFIGURATION INFORMATION TABLE

| TERMINAL ID | TERMINAL NAME | ATTRIBUTE INFORMATION | | NETWORK DATA (POSITION ON BUS, TRANSMISSION RATE) | PRODUCING STATE FLAG |
|---|---|---|---|---|---|
| | | FUNCTION | VERSION | | |
| 1 | DATA GATEWAY UNIT | DATA GATEWAY | 1.0 | 1-(400Mbps)-2<br>1-(200Mbps)-4 | FINISHED |
| 2 | TV | IMAGE DATA DISPLAY | 2.0 | 1-(400Mbps)-2-(200Mbps)-5 | FINISHED |
| 3 | MONITORING CAMERA | IMAGE DATA PRODUCTION | 1.0 | 4-(200Mbps)-3 | FINISHED |
| 4 | MONITORING MONITOR | IMAGE DATA DISPLAY | 1.0 | 1-(400Mbps)-4-(100Mbps)-3 | FINISHED |
| 5 | VTR | IMAGE DATA STORAGE, IMAGE DATA REPRODUCTION | 1.0 | 2-(200Mbps)-5 | FINISHED |
| ----- | | | | | |

FIG.5

SERVICE INFORMATION TABLE

| SERVICE ID | SERVICE NAME | FUNCTIONAL COMPONENT INFORMATION | TERMINAL COMBINATION INFORMATION | PRODUCING STATE FLAG |
|---|---|---|---|---|
| 1 | TV VIDEO RECEPTION | DATA GATEWAY, IMAGE DATA DISPLAY | DATA GATEWAY UNIT, TV | FINISHED |
| 2 | REAL-TIME MONITORING IMAGE DISPLAY | IMAGE DATA PRODUCTION, IMAGE DATA DISPLAY | MONITORING CAMERA, MONITORING MONITOR | FINISHED |
| 3 | REAL-TIME MONITORING IMAGE TRANSMISSION | IMAGE DATA PRODUCTION, IMAGE DATA GATEWAY | MONITORING CAMERA, DATA GATEWAY UNIT | FINISHED |
| 4 | TIME-SHIFTED TV VIDEO DISPLAY | IMAGE DATA REPRODUCTION, IMAGE DATA DISPLAY | VTR, TV | FINISHED |
| 5 | MONITORING IMAGE STORAGE | IMAGE DATA PRODUCTION, IMAGE DATA STORAGE | MONITORING CAMERA, VTR | FINISHED |
| 6 | TIME-SHIFTED MONITORING IMAGE DISPLAY | IMAGE DATA REPRODUCTION, IMAGE DATA DISPLAY | VTR, MONITORING MONITOR | FINISHED |
| 7 | TIME SHIFTED MONITORING IMAGE TRANSMISSION | IMAGE DATA REPRODUCTION, IMAGE DATA GATEWAY | VTR, DATA GATEWAY UNIT | FINISHED |
| ----- | | | | |

FIG.7
SERVICE TABLE

| SERVICE No. | SERVICE TYPE | SERVICE NAME | FUNCTIONAL COMPONENT INFORMATION |
|---|---|---|---|
| 1 | TV SERVICE | TV VIDEO RECEPTION | DATA GATEWAY, IMAGE DATA DISPLAY |
| 2 | TV SERVICE | TIME-SHIFTED TV VIDEO DISPLAY | IMAGE DATA REPRODUCTION, IMAGE DATA DISPLAY |
| 3 | MONITORING SERVICE | REAL-TIME MONITORING IMAGE DISPLAY | IMAGE DATA PRODUCTION, IMAGE DATA DISPLAY |
| 4 | MONITORING SERVICE | REAL-TIME MONITORING IMAGE TRANSMISSION | IMAGE DATA PRODUCTION, DATA GATEWAY |
| 5 | MONITORING SERVICE | MONITORING IMAGE STORAGE | IMAGE DATA PRODUCTION, IMAGE DATA STORAGE |
| 6 | MONITORING SERVICE | TIME SHIFTED MONITORING IMAGE DISPLAY | IMAGE DATA PRODUCTION, IMAGE DATA DISPLAY |
| 7 | MONITORING SERVICE | TIME-SHIFTED MONITORING IMAGE TRANSMISSION | IMAGE DATA REPRODUCTION, DATA GATEWAY |
| 8 | PC SERVICE | PRINT OUT | DATA PRODUCTION, DATA PRINTING |
| | ----- | | |

DATA GATEWAY UNIT AND DATA GATEWAY METHOD

BACKGROUND OF THE INVENTION

1. Field of the Invention

The present invention relates to a data gateway unit and a data gateway method that enable a user to set up or update system information with ease.

2. Description of Related Art

FIG. 14 is a block diagram showing a configuration of a home bus system connected to a conventional data gateway unit (home bus controller), which is disclosed in Japanese patent application laid-open No. 7-67186. In this figure, the reference numeral 1 designates a home bus of the home bus system; 2 and 3 designate home-bus equipment such as a television set, telephone and personal computer; 4 designates a system setup unit for setting system information to the home bus controller 6; 5 designates an adapter for connecting the system setup unit 4 to the home bus 1; and 6 designates a home bus controller for controlling the home-bus equipment 2 and 3 in accordance with the system information set by the system setup unit 4.

FIG. 15 is a block diagram showing an internal configuration of the system setup unit 4. In this figure, the reference numeral 11 designates a memory for storing the system information; 12 designates a battery for supplying the memory 11 with power; 13 designates a display unit for displaying an operation state, the system information, set data and the like; and 14 designates a controller for controlling the memory 11 and display unit 13 in such a manner that it stores in the memory 11 the system information edited offline by a personal computer, and loads online an internal memory of the home bus controller 6 with the system information stored in the memory 11.

The reference numeral 15 designates a home bus 10 interface (I/F); 16 designates a home bus connector for connecting the system setup unit 4 to the adapter 5; 17 designates a PC (personal computer) interface; and 18 designates an RS232C connector for connecting the system setup unit 4 to the personal computer.

Next, the operation of the conventional system will be described.

First, system setup unit 4 is connected to the personal computer by connecting the RS232C connector 18 to the personal computer.

Thus, the controller 14 can capture the system information produced by the personal computer through the PC interface 17, and store the system information to the memory 11.

After the system information has been stored in the memory 11, the system setup unit 4 is carried to a setup site, and is connected to the home bus 1 through the adapter 5.

When the system setup unit 4 is connected to the home bus 1, the controller 14 loads the internal memory of the home bus controller 6 with the system information stored in the memory 11.

After that, the home bus controller 6 controls the home-bus equipment 2 and 3 in accordance with the system information loaded on the internal memory.

With the foregoing configuration, the conventional data gateway unit, that is, the home bus controller 6 can be loaded with the system information, which is produced by the personal computer and then stored in the system setup unit 4, by connecting the system setup unit 4 to the home bus 1. Therefore, it has an advantage of being able to set up or update the system information of services used by a user. However, it is difficult for a user who has not sufficient knowledge of the personal computer, home bus 1 or system information to readily produce the system information. This presents a problem in that the user cannot easily set up or update the system information.

In addition, although a connection of a new home-bus unit to the home bus 1 after the system information has been set can make a new service available in combination with the previously connected home-bus equipment 2 and 3, the connection does not automatically start the update of the system information. This presents a further problem in that the new service cannot be used until the complicated setup or update of the system information has been completed.

For example, consider a case when a monitoring system including a camera and a dedicated monitor is set up on the home bus 1, and a user further connects a data storage unit such as a VTR (videotape recorder) to the home bus 1 to use the monitoring system for other than the intended use (for enjoying audio-video resources, for example). Although new monitoring services such as recording the monitoring data may become available in this case, the setup for implementing the unintended services will be tedious or difficult for a user lacking expert knowledge.

SUMMARY OF THE INVENTION

The present invention is implemented to solve the foregoing problems. It is therefore an object of the present invention to provide a data gateway unit and a data gateway method enabling a user to readily identify available services and to easily carry out setup and update of the services.

According to a first aspect of the present invention, there is provided a data gateway unit comprising: configuration information update means for examining a connection state of a terminal on a customer premise network side, and for updating configuration information on the customer premise network; service menu means for enumerating, in response to the configuration information on the customer premise network which the configuration information update means updates, available services the terminal on the customer premise network side can implement; and service presentation and selection means for notifying a user of the available services the service menu means enumerates, and for accepting a service selected by the user.

Here, the service menu means may look at a service table to enumerate the available services the terminal on the customer premise network side can implement.

The service menu means may request a service provider connected to a public network to send update data of the service table, and update the service table in accordance with the update data sent from the service provider.

The service menu means may receive, when a service provider connected to a public network makes an inquiry about an update of the service table, update data of the service table from the service provider, and update the service table in accordance with the update data.

The service menu means may receive, in response to an update request of the service table from a user, update data of the service table from a terminal connected to one of the customer premise network and a public network, and update the service table in accordance with the update data.

The service menu means may further enumerate available services that can be implemented using a function of a terminal connected to a public network.

The service presentation and selection means may notify the user of the available services enumerated by the service menu means in response to an inquiry about the available services from the user.

The service presentation and selection means may autonomously notify a user of the available services the service menu means enumerates.

The service presentation and selection means may convert data on contents of the available services into a data format desired by the user when notifying the user of the available services.

According to a second aspect of the present invention, there is provided a data gateway method comprising the steps of: examining a connection state of a terminal on a customer premise network side, and updating configuration information on the customer premise network; enumerating, in response to the configuration information on the customer premise network, available services the terminal on the customer premise network side can implement; and notifying a user of the available services, and accepting a service selected by the user.

Here, the step of enumerating the available services may be carried out referring to a service table, when the terminal on the customer premise network side enumerates the available services.

BRIEF DESCRIPTION OF THE DRAWINGS

FIG. 3 shows a customer premise network configuration information table;

FIG. 5 shows a service information table;

FIG. 7 shows a service table;

DETAILED DESCRIPTION OF THE PREFERRED EMBODIMENTS

The invention will now be described with reference to the accompanying drawings.

EMBODIMENT 1

Figure 1:
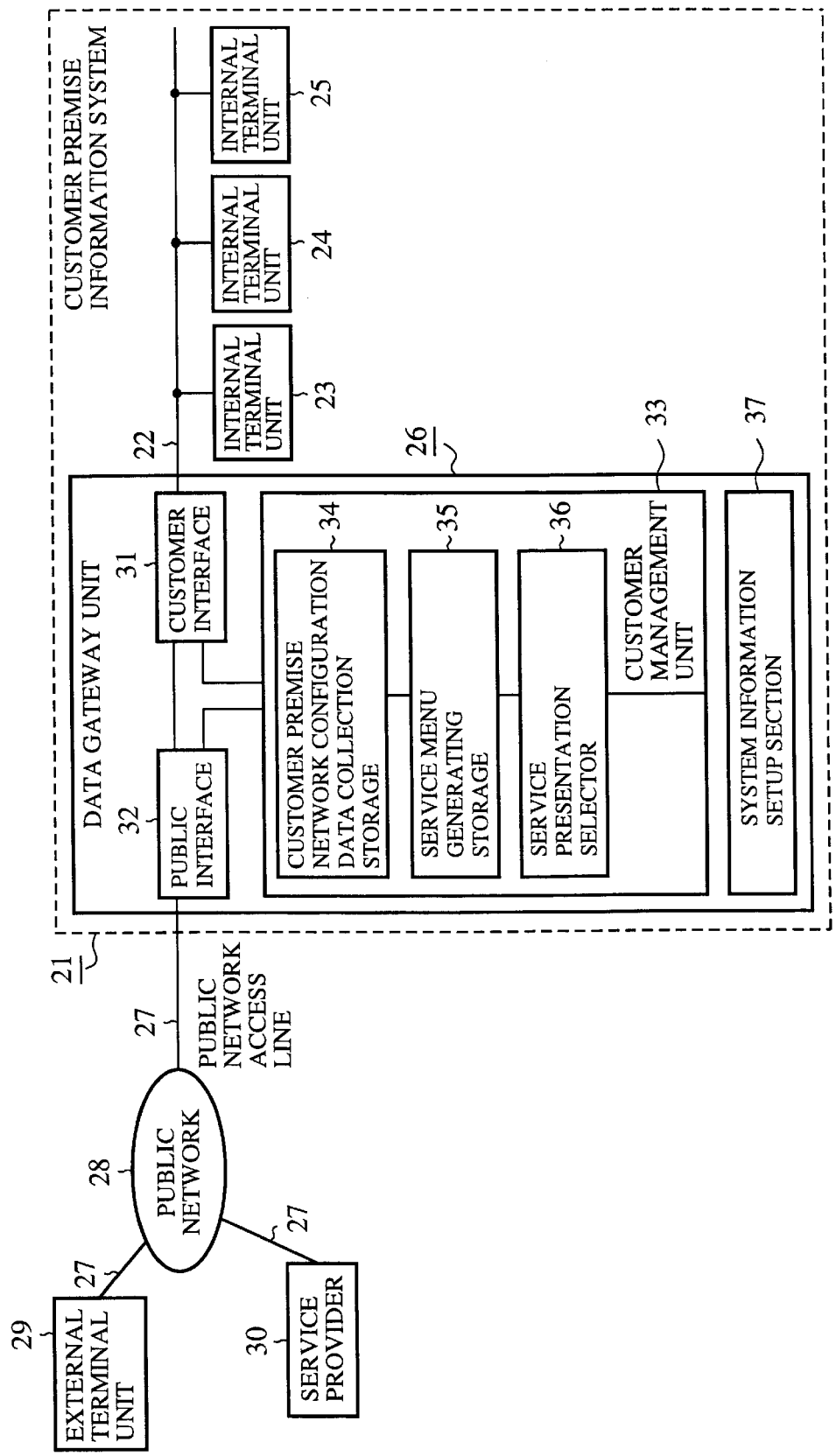
FIG. 1 is a block diagram showing a configuration of an information system incorporating an embodiment 1 of a data gateway unit in accordance with the present invention.

FIG. 1 is a block diagram showing a configuration of an information system incorporating an embodiment 1 of a data gateway unit in accordance with the present invention. In this figure, the reference numeral 21 designates a customer premise information system comprising a customer premise network 22, internal terminal units 23–25 and a data gateway unit 26; 22 designates the customer premise network; 23–25 each designate an internal terminal unit (terminal) connected to the customer premise network 22; 26 designates the data gateway unit; 27 designates a public network access line; 28 designates a public network; 29 designates an external terminal unit (terminal) connected to the public network 28; and 30 designates a service provider connected to the public network 28.

The reference numeral 31 designates a customer interface; 32 designates a public interface; 33 designates a customer management unit; 34 designates a customer premise network configuration data collection storage (configuration information update means) for checking connection states of the internal terminal unit 23 and the like on the customer premise network 22 side, and for updating the configuration information on the customer premise network 22; 35 designates a service menu generating storage (service menu means) for enumerating services the internal terminal unit 23 and the like on the customer premise network 22 side can implement in accordance with the configuration information on the customer premise network 22, which is updated by the customer premise network configuration data collection storage 34; 36 designates a service presentation selector (service presentation and selection means) for notifying a user of the services enumerated by the service menu generating storage 35, and for accepting a service the user chooses to utilize; and 37 designates a system information setup section for setting the system information in response to the selection result of the usr.

Figure 2:
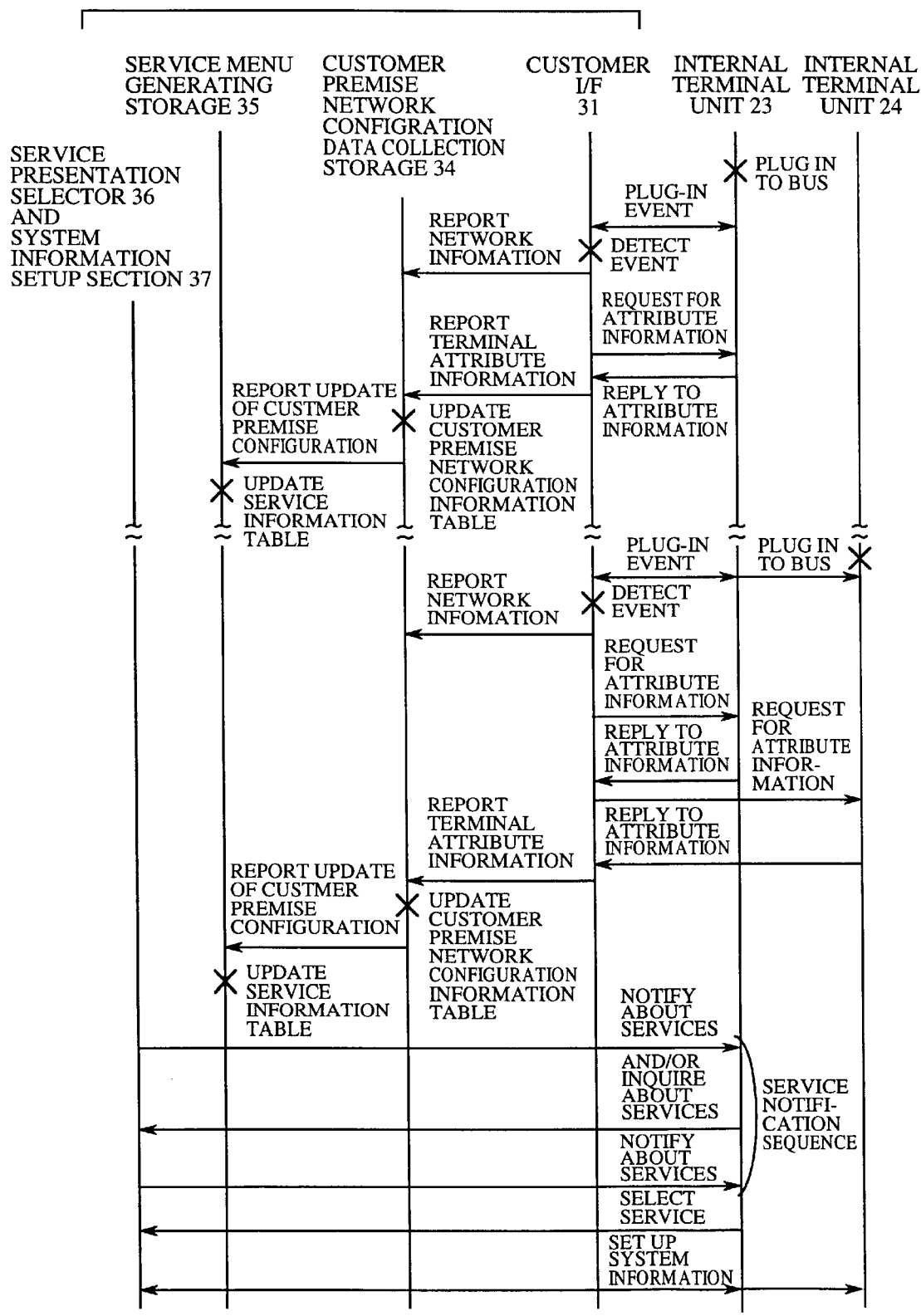
FIG. 2 is a sequence diagram of the entire processing of the information system.
Figure 4:
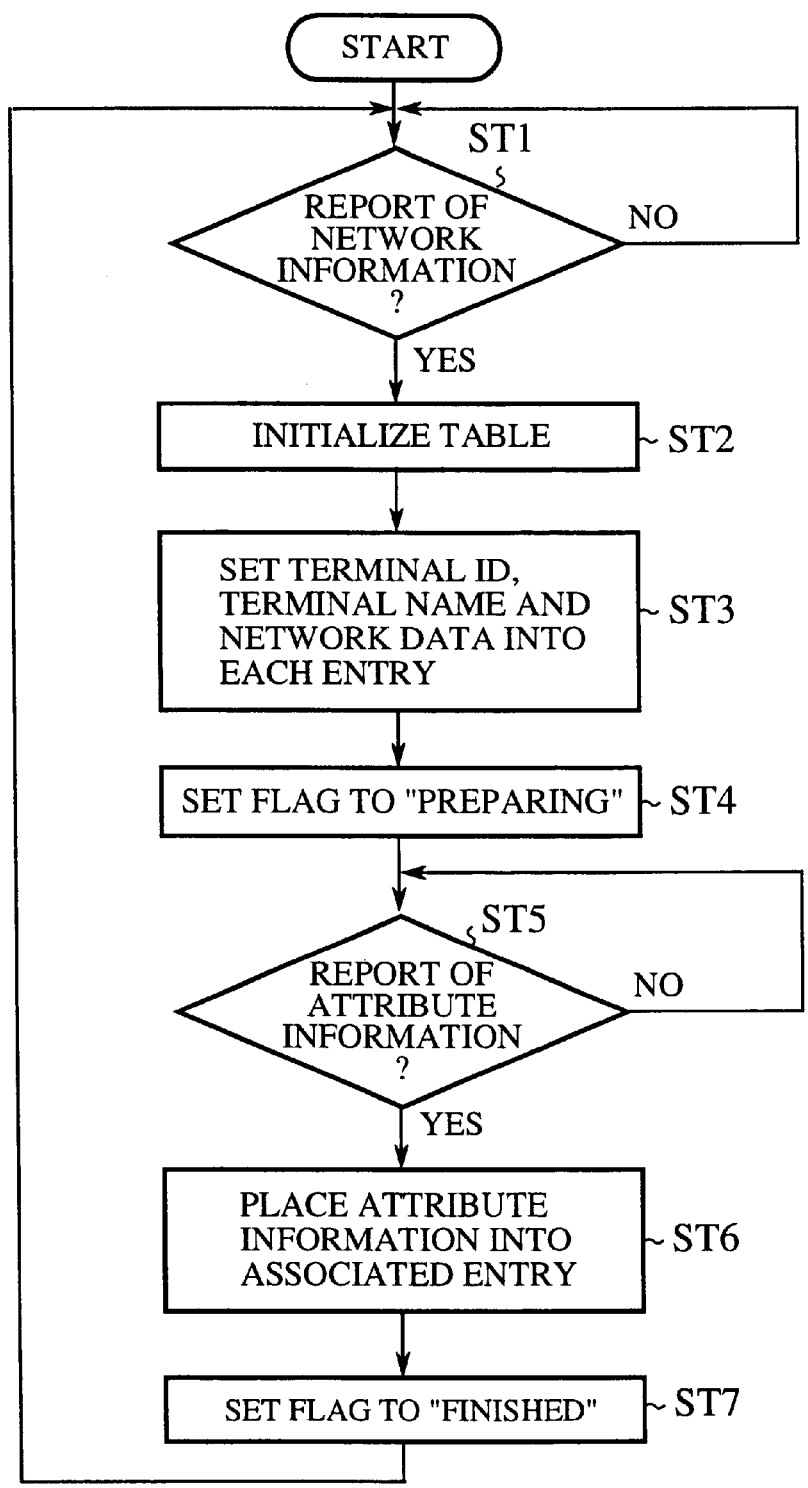
FIG. 4 is a flowchart illustrating a processing of a customer premise network configuration data collection storage.
Figure 6:
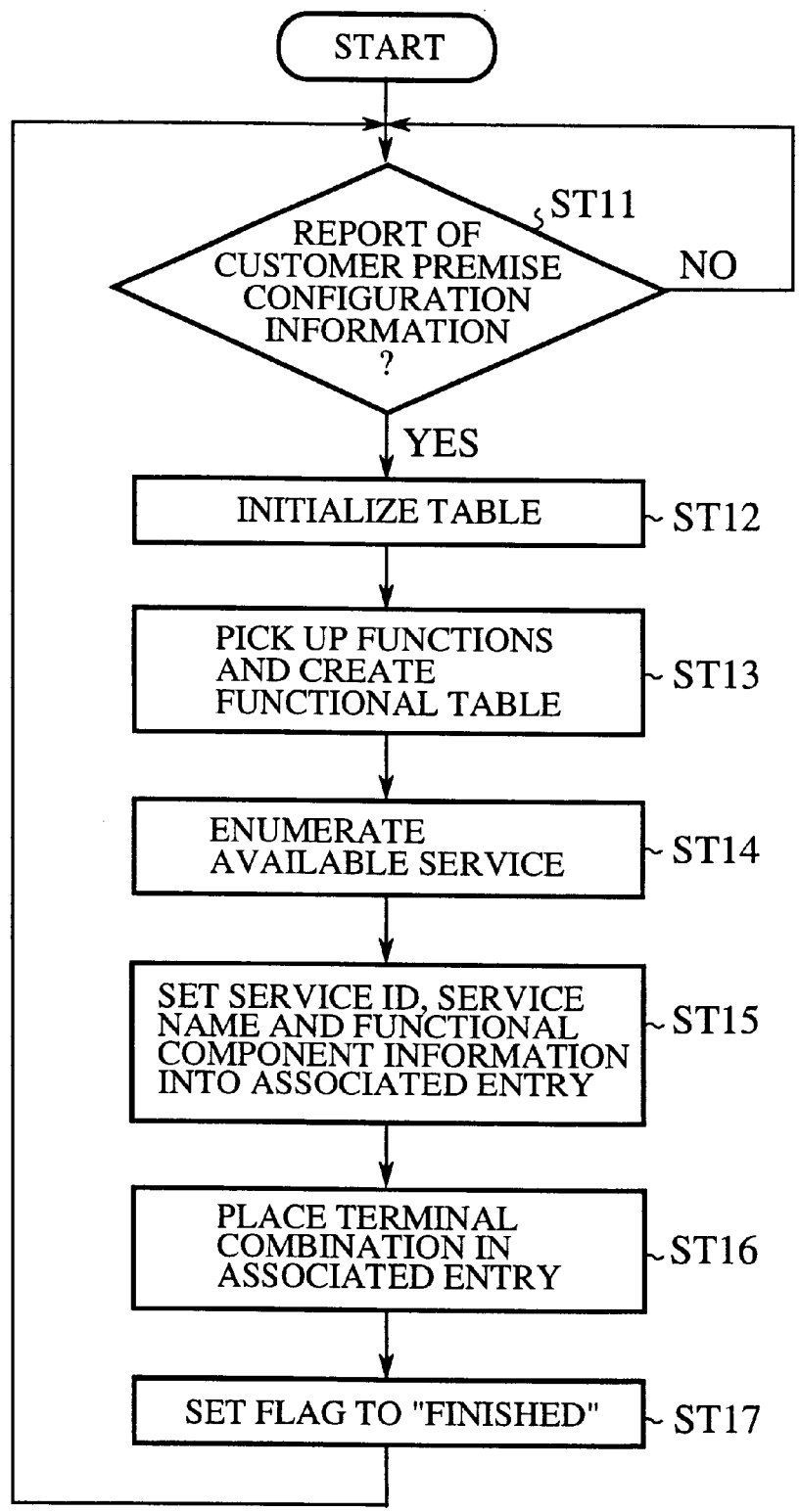
FIG. 6 is a flowchart illustrating a processing of a service menu generating storage.
Figure 8:
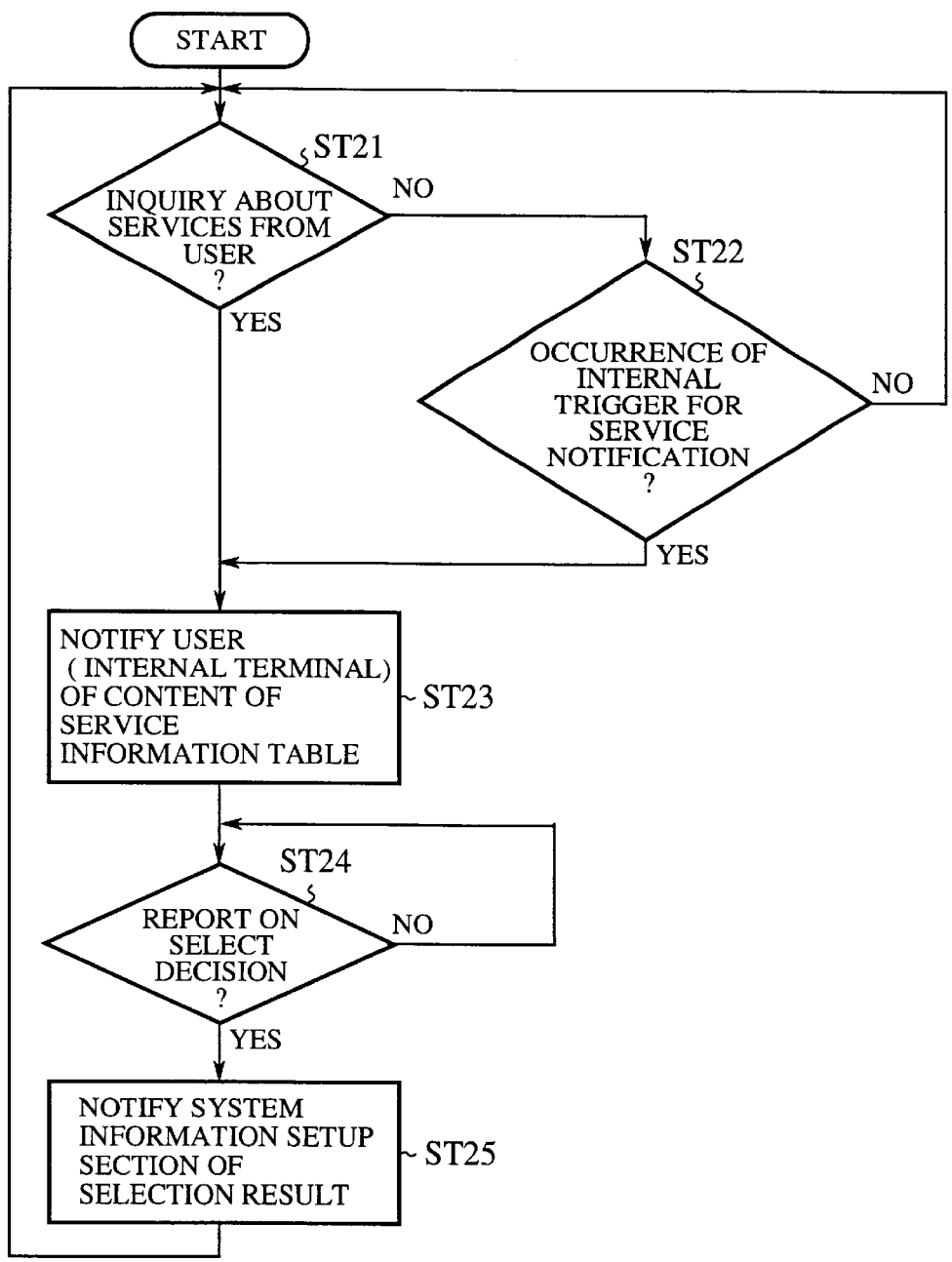
FIG. 8 is a flowchart illustrating a processing of a service presentation selector.

Next, the operation of the present embodiment 1 will be described with reference to FIGS. 2–8. Here, FIG. 2 is a sequence diagram illustrating the entire processing of the information system; FIG. 3 shows a customer premise network configuration information table; FIG. 4 is a flowchart illustrating a processing of the customer premise network configuration data collection storage 34; FIG. 5 shows a service information table; FIG. 6 is a flowchart illustrating a processing of the service menu generating storage 35; FIG. 7 shows a service table; and FIG. 8 is a flowchart illustrating a processing of the service presentation selector 36.

First, referring to the sequence chart shown in FIG. 2, the outline of the operation of the data gateway unit 26 will be described.

When the internal terminal unit 23 is plugged into the customer premise network 22 in the case where only the data gateway unit 26 is present on the customer premise network 22, a plug-in event takes place, and is detected by the customer interface 31 in the data gateway unit 26 as shown in FIG. 2.

Detecting the plug-in event, the customer interface 31 notifies the customer premise network configuration data collection storage 34 in the customer management unit 33 of the network information reporting the change (an increase, in this case) in the number of the internal terminal units on the customer premise network 22.

At the same time, the customer interface 31 requests all the internal terminal units on the customer premise network 22 to send the attribute information describing the functions and the like of the internal terminal units.

Receiving the attribute information from the internal terminal unit 23, the customer interface 31 transfers the attribute information to the customer premise network configuration data collection storage 34.

The customer premise network configuration data collection storage 34, receiving the attribute information from the customer interface 31, updates the customer premise network configuration information table in accordance with the attribute information (details of the update processing will be described later).

Subsequently, the customer premise network configuration data collection storage 34 notifies the service menu generating storage 35 of customer premise configuration information indicating the change (an increase, in this case) in the customer premise network configuration.

Receiving the customer premise configuration information from the customer premise network configuration data collection storage 34, the service menu generating storage 35 updates the service information table in accordance with the customer premise configuration information (details of the update processing will be described later).

When another internal terminal unit 24 is further plugged into the customer premise network 22, another plug-in event occurs, causing the data gateway unit 26 to iterate the processing sequence as described above.

When the foregoing sequences have been completed, the internal terminal unit 23 or 24 or the data gateway unit 26 activates, at any given time, a service presentation sequence carried out between the internal terminal unit 23 or 24 and the service presentation selector 36. Subsequently, the internal terminal unit 23 or 24 activates a service selection sequence carried out between the internal terminal unit 23 or 24 and the service presentation selector 36.

Furthermore, the data gateway unit 26 activates a system information setup sequence carried out between the system information setup section 37 and the internal terminal unit 23 or 24.

Here, when the service selected by the user involves the data gateway unit 26, the system information setup section 37 sets the system information not only in the internal terminal unit 23 or 24, but also in the data gateway unit 26 itself.

Next, the operation of the customer premise network configuration data collection storage 34 in the data gateway unit 26 will be described in detail.

The customer premise network configuration data collection storage 34 includes a customer premise network configuration information table as shown in FIG. 3. FIG. 3 shows an example of a format of the customer premise network configuration information table to be updated. For example, it has entries corresponding to the number of the terminals to be connected to the customer premise network 22, and includes for each internal terminal unit such items as terminal ID (like global unique ID, node ID, etc.) for identifying the terminal, terminal name, attribute information (functions of the terminal, its version number, etc.) network data (location of the internal terminal unit on the bus, its transmission rate, etc.), and producing state flag for indicating a step in the producing process of the table.

When the number of the internal terminal units on the customer premise network 22 varies due to the plug in of an internal terminal unit, the customer interface 31 notifies the customer premise network configuration data collection storage 34 of the network information on all the internal terminal units, including the terminal IDs, terminal names and network data.

Receiving the network information from the customer interface 31 (step ST1), the customer premise network configuration data collection storage 34 initializes the customer premise network configuration information table, and sets the producing state flags of all the entries to the "initial" state (step ST2).

Subsequently, the customer premise network configuration data collection storage 34, referring to the network information sent from the customer interface 31, places in the entries the terminal IDs, terminal names and network data of the individual internal terminal units (step ST3), and then sets the producing state flags at a "preparing" state (step ST4).

In addition, receiving the attribute information of the internal terminal units from the customer interface 31 (step ST5), the customer premise network configuration data collection storage 34 sets the attribute information in the attribute information box of the customer premise network configuration management information table corresponding to the originating internal terminal unit (step ST6), and sets the producing state flag at a "finished" state (step ST7).

For example, when a VTR is plugged into the system including the data gateway unit, a television set, a monitoring camera and a monitoring monitor, which are all connected to the customer premise network 22, the customer premise network configuration information table is set as shown in FIG. 3.

Next, the operation of the service menu generating storage 35 in the data gateway unit 26 will be described in detail.

FIG. 5 shows a format of the service information table to be updated, which is stored in the service menu generating storage 35. For example, it includes entries corresponding to the number of services available by users, and stores as its items service IDs for identifying the services, service names, functional component information for designating combinations for implementing the services, terminal combination information for designating concrete service configuration terminals and producing state flags for indicating a producing step.

When an internal terminal unit is plugged in, the customer premise network configuration data collection storage 34 notifies the service menu generating storage 35 of the customer premise configuration information reporting the update of the customer premise network configuration information table.

Receiving the customer premise configuration information from the customer premise network configuration data collection storage 34 (step ST1), the service menu generating storage 35 initializes the service information table, setting the producing state flags of all the entries to the "initial" state (step ST12).

Subsequently, the service menu generating storage 35 picks up the functions of the attribute information from the customer premise configuration information (customer premise network configuration information table) received from the customer premise network configuration data collection storage 34, and generates a functional table (step ST13).

The service menu generating storage 35, which keeps a service table describing combinations of functional components required for implementing particular services (see, FIG. 7), referring to the service table, enumerates services implemented by the combinations in the functional table after generating the functional table from the attribute information (step ST14).

Subsequently, the service menu generating storage 35 sets information about the items of the service IDs, service names and functional component information for all the services (step ST15), and sets the combinations of the concrete terminals to the terminal combination information items (step ST16). When there are a plurality of internal terminal units having the same function, a plurality of terminal combinations are set. Then, the producing state flag is set at the "finished" state (step ST17).

For example, when a VTR is plugged into the system comprising on the customer premise network 22 the data gateway unit, a TV set, a monitoring camera and a monitoring monitor connected to the network, the service information table is set as shown in FIG. 5.

When a user plugs the VTR into the system to receive a time-shifted TV video display service (service ID=4), other services are also generated such as a monitoring image storage service (service ID=5), time-shifted monitoring image display service (service ID=6) and time-shifted monitoring image transmission service (service ID=7).

Although the foregoing example generates the services in terms of only the functions of the internal terminal units, more various service items can be generated by considering the version information. Furthermore, such services as improving user conveniences can be generated in the case where a plurality of the internal terminal units with the same functions are present by taking account of the network data in such a manner as to select the internal terminal unit implementing the maximum performance.

Next, the operation of the service presentation selector 36 in the data gateway unit 26 will be described in detail.

The start trigger for operating the service presentation selector 36 includes an action taken by a user to inquire about available services of the internal terminal unit 23 (step ST21), and a trigger caused by an internal event generated to autonomously notify the user of the services from the data gateway unit 26 (step ST22)

In response to the start trigger, the service presentation selector 36 notifies the internal terminal unit 23 used by the user about the contents of the service information table (step ST23).

When the service presentation selector 36 receives the notification of the service selected by the user from the internal terminal unit 23 in connection with the contents of the service information table, it notifies the system information setup section 37 about the service (step ST24) to be set.

As described above, the present embodiment 1 is configured such that when the configuration information on the customer premise network 22 is updated, it enumerates, in response to the new configuration information, the services the internal terminal unit 23 or the like on the side of the customer premise network 22 can implement, notifies the user of the services, and accepts the service the user selects. This offers an advantage of enabling the user to readily recognize the services available in the current configuration of the devices, and to easily change the setup for the service the user selects.

EMBODIMENT 2

Although the service menu generating storage 35 statically keeps the service table in the foregoing embodiment 1, the service table can be changed dynamically in its setup.

Figure 9:
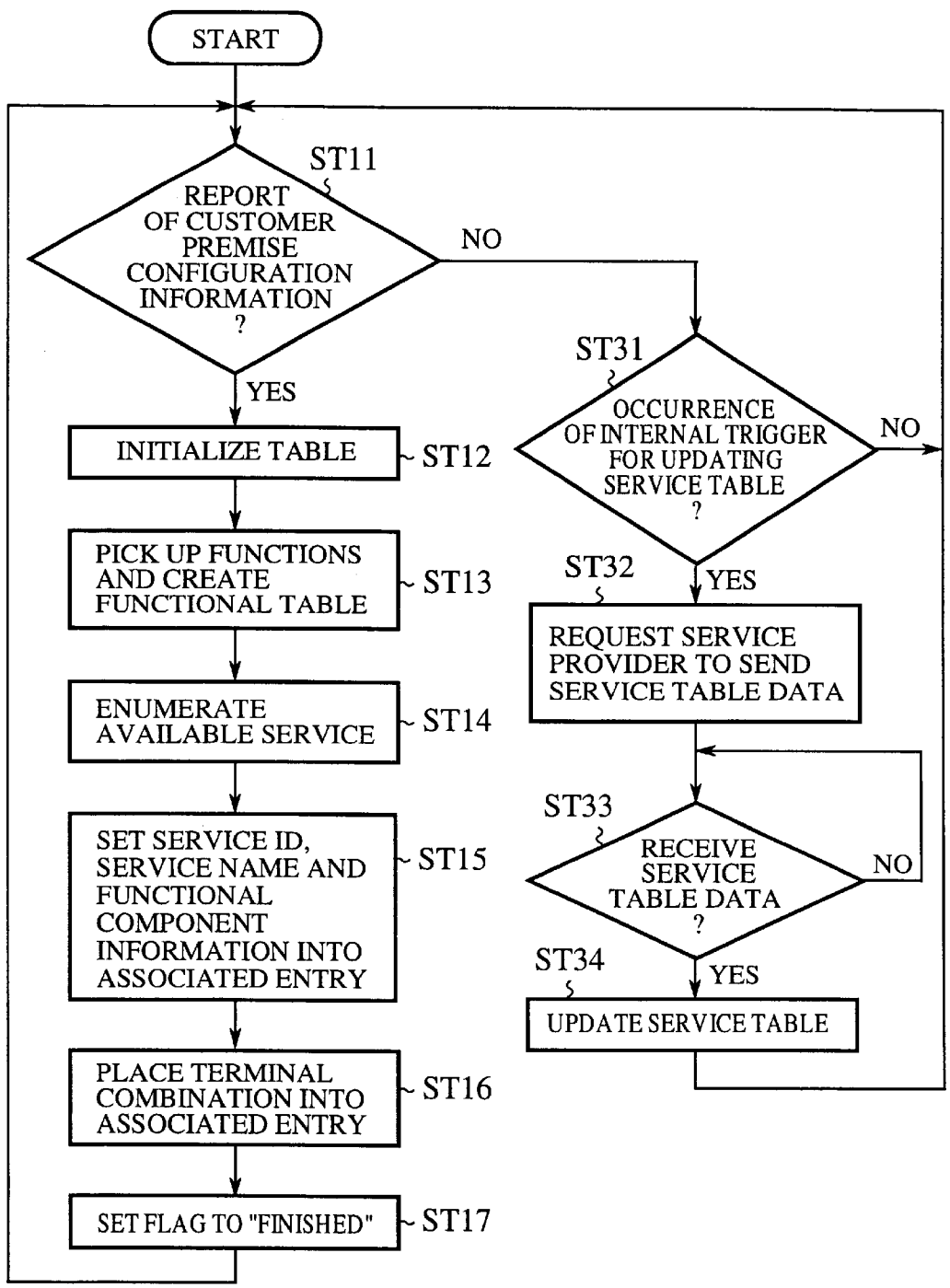
FIG. 9 is a flowchart illustrating a processing of the service menu generating storage of an embodiment 2 of the data gateway unit in accordance with the present invention.
Figure 10:
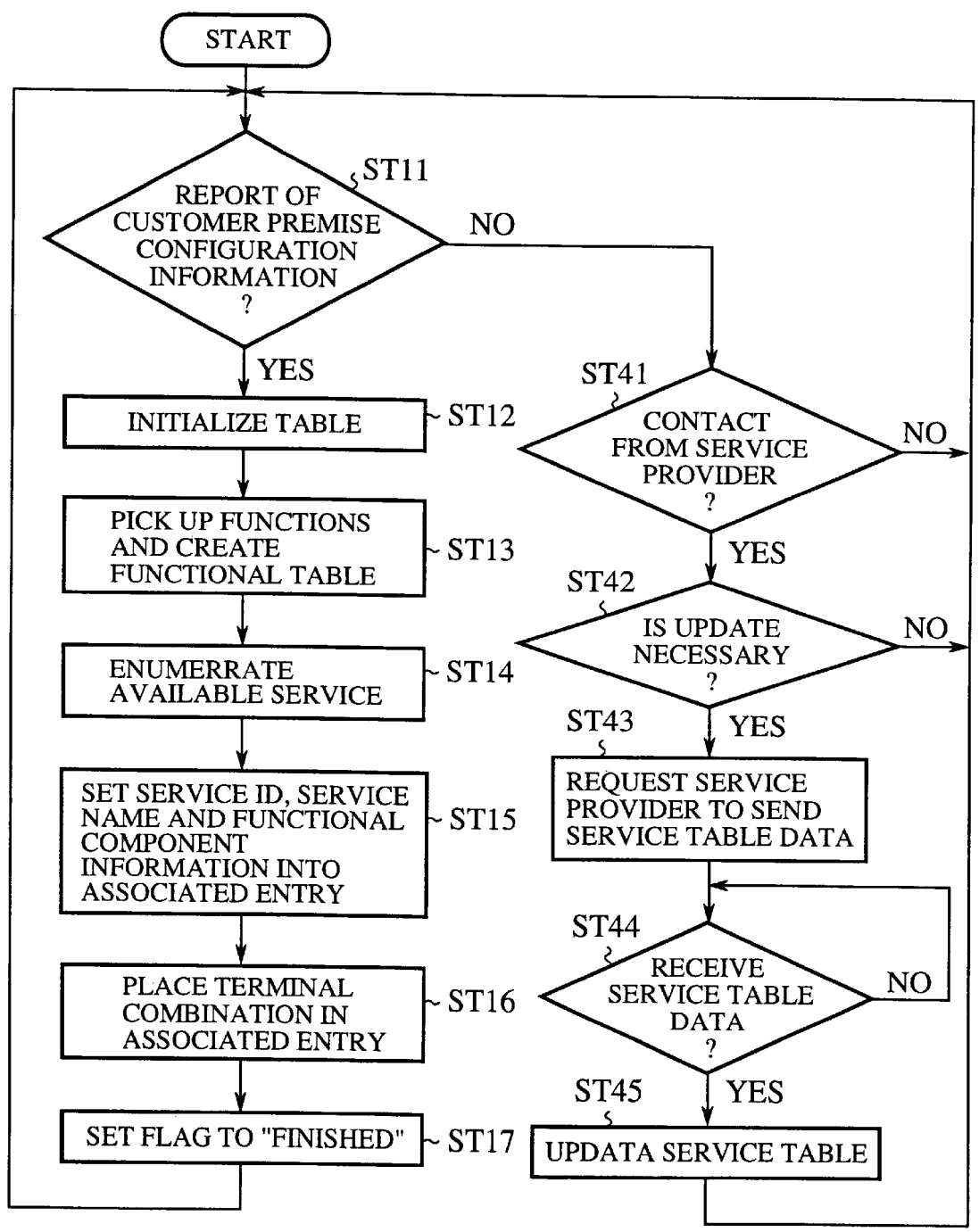
FIG. 10 is a flowchart illustrating another processing of the service menu generating storage of the embodiment 2 of the data gateway unit in accordance with the present invention.
Figure 11:
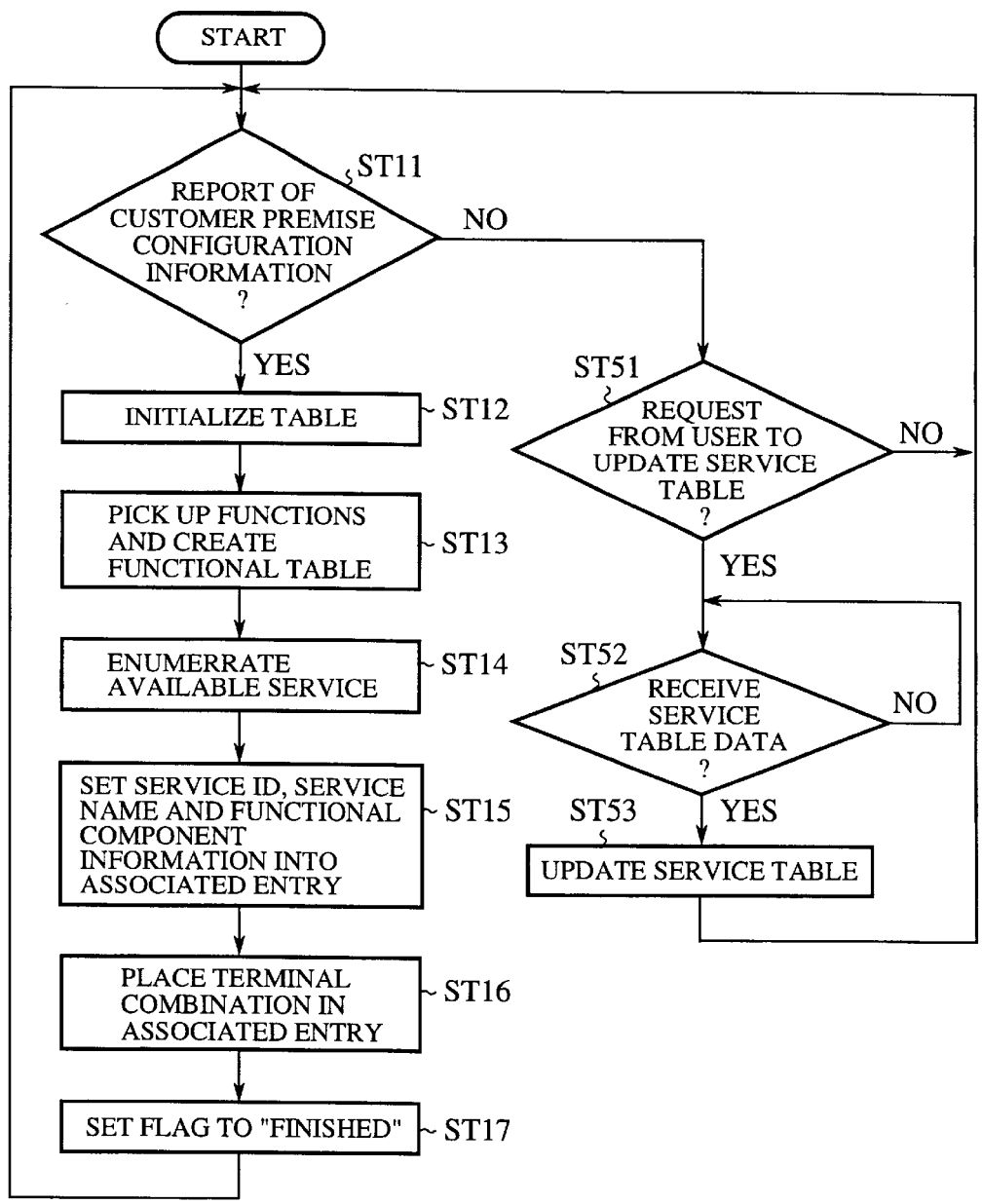
FIG. 11 is a flowchart illustrating a still another processing of the service menu generating storage of the embodiment 2 of the data gateway unit in accordance with the present invention.

FIGS. 9–11 are flowcharts illustrating processings of the service menu generating storage 35 in the data gateway unit of the present embodiment 2 in accordance with the present invention.

FIG. 9 shows an example in which the service menu generating storage 35 autonomously accesses the service provider 30, and dynamically varies the setup of the service table. In FIG. 9, the same reference symbols designate the same steps as in FIG. 6, and the description thereof is omitted here.

In response to the internal trigger for updating the service table, which is caused by a customer premise configuration information report from the customer premise network configuration data collection storage 34 or by a timer (step ST31), the service menu generating storage 35 accesses the service provider 30 connected to the public network 28, making request for the update data of the service table (step ST32).

Receiving the update data of the service table from service provider 30 (step ST33), the menu generating storage 35 updates the service table in accordance with the update data (step ST34), and enters the report waiting state awaiting the customer premise configuration information.

FIG. 10 shows an example in which the service menu generating storage 35 is accessed by the service provider 30, and dynamically varies the setup of the service table. In FIG. 10, the same reference symbols designate the same steps as in FIG. 6, and the description thereof is omitted here.

In response to an inquiry about the update of the service table from the service provider 30 (step ST41), the service menu generating storage 35 makes a decision as to the need for the update (step ST42).

When it decides that the update is unnecessary, it ignores the inquiry. In contrast, when it decides that the update is necessary, it accesses the service provider 30 connected to the public network 28, and requests it to send the update data of the service table (step ST43).

Receiving the update data of the service table from the service provider 30 (step ST44), the service menu generating storage 35 updates the service table in accordance with the update data (step ST45). Subsequently, it enters the report waiting state awaiting the customer premise configuration information.

FIG. 11 shows an example in which the service menu generating storage 35 dynamically varies the setup of the service table in response to the instruction from the user. In FIG. 11, the same reference symbols designate the same processing steps as in FIG. 6, and the description thereof is omitted here.

Receiving the update instruction of the service table from the user (step ST51), the service menu generating storage 35 enters a state allowing it to receive the update data of the service table from an internal terminal unit or from an external terminal unit.

Receiving the update data of the service table from the internal terminal unit or external terminal unit (step ST52), the service menu generating storage 35 updates the current service table in accordance with the update data (step ST53). Subsequently, it enters the report waiting state awaiting the customer premise configuration information.

As described above, the present embodiment 2 is configured such that the service menu generating storage 35 receives the update data of the service table from the service provider 30, internal terminal unit or external terminal unit, and updates the current service table. This enables the service menu generating storage 35 to generate the service information table with the latest service menu, and offers an advantage of enabling the user to utilize the latest services the present configuration of the devices can implement. Furthermore, the service provider 30 can provide new means for the user to utilize the new services. This offers an advantage of being able to enlarge the business.

EMBODIMENT 3

Although the foregoing embodiment 1 looks at the service table to enumerate the services achievable using the functions of the internal terminal unit, this is not essential. For example, even if the internal terminal units cannot achieve the functions required, it is possible to enumerate services that can be implemented using the functions of the external terminal unit 29 connected to the public network 28.

Figure 12:
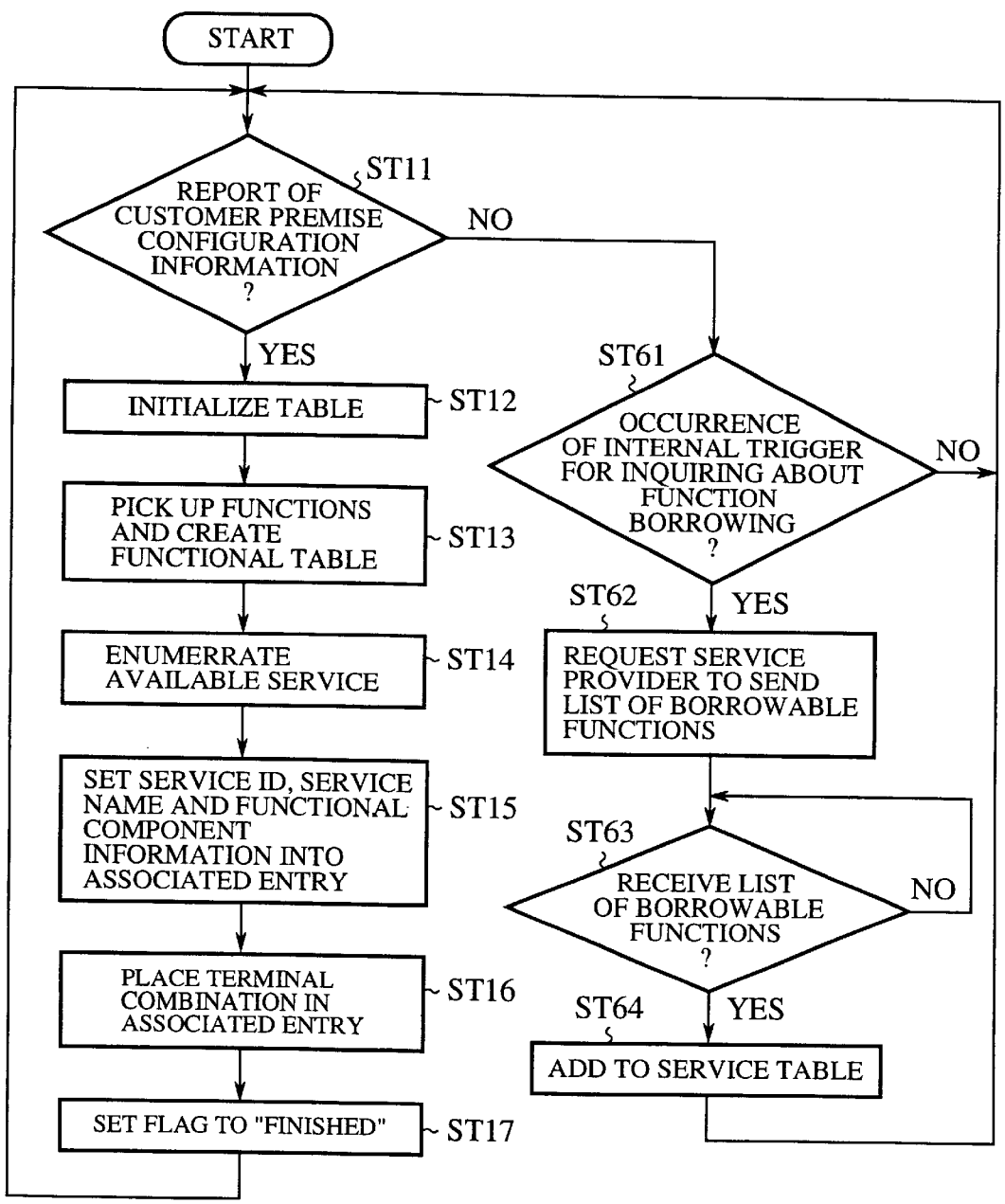
FIG. 12 is a flowchart illustrating a processing of the service menu generating storage of an embodiment 3 of the data gateway unit in accordance with the present invention.

FIG. 12 is a flowchart illustrating a processing of the service menu generating storage 35 in the data gateway unit of the embodiment 3 in accordance with the present invention, in which the same reference symbols designate the same steps as in FIG. 6, and the description thereof is omitted here.

In response to an internal trigger for inquiring about function borrowing, which is caused by a customer premise configuration information report from the customer premise network configuration data collection storage 34 or by a timer (step ST61), the service menu generating storage 35 accesses the service provider 30 connected to the public network 28, making a request for a list of borrowable functions (step ST62).

Receiving the list of the borrowable functions from the service provider 30 (step ST63), the service menu generating storage 35 looks at the functional list, and registers the list of the borrowable functions to the service table (step ST64). Subsequently, it enters the report waiting state awaiting the customer premise configuration information.

Thus, the service menu generating storage 35 can enumerate the functions which are not provided by the internal terminal unit, but are achieved by utilizing the functions of the external terminal unit 29 connected to the public network 28.

As described above, the present embodiment 3 registers to the service table the borrowable functions the service menu generating storage 35 receives from the service provider 30. This makes it possible to enumerate the services which cannot be offered by the internal terminal unit, but can be implemented by utilizing the functions of the external terminal unit 29 connected to the public network 28. As a result, the present embodiment 3 offers an advantage of enabling users to utilize a greater number of services.

EMBODIMENT 4

Although the foregoing embodiment 1 does not refer to the format of the data describing the services when the service presentation selector 36 notifies a user of the available services, the data describing the services can be converted to a data format the user desires before notifying the user.

Figure 13:
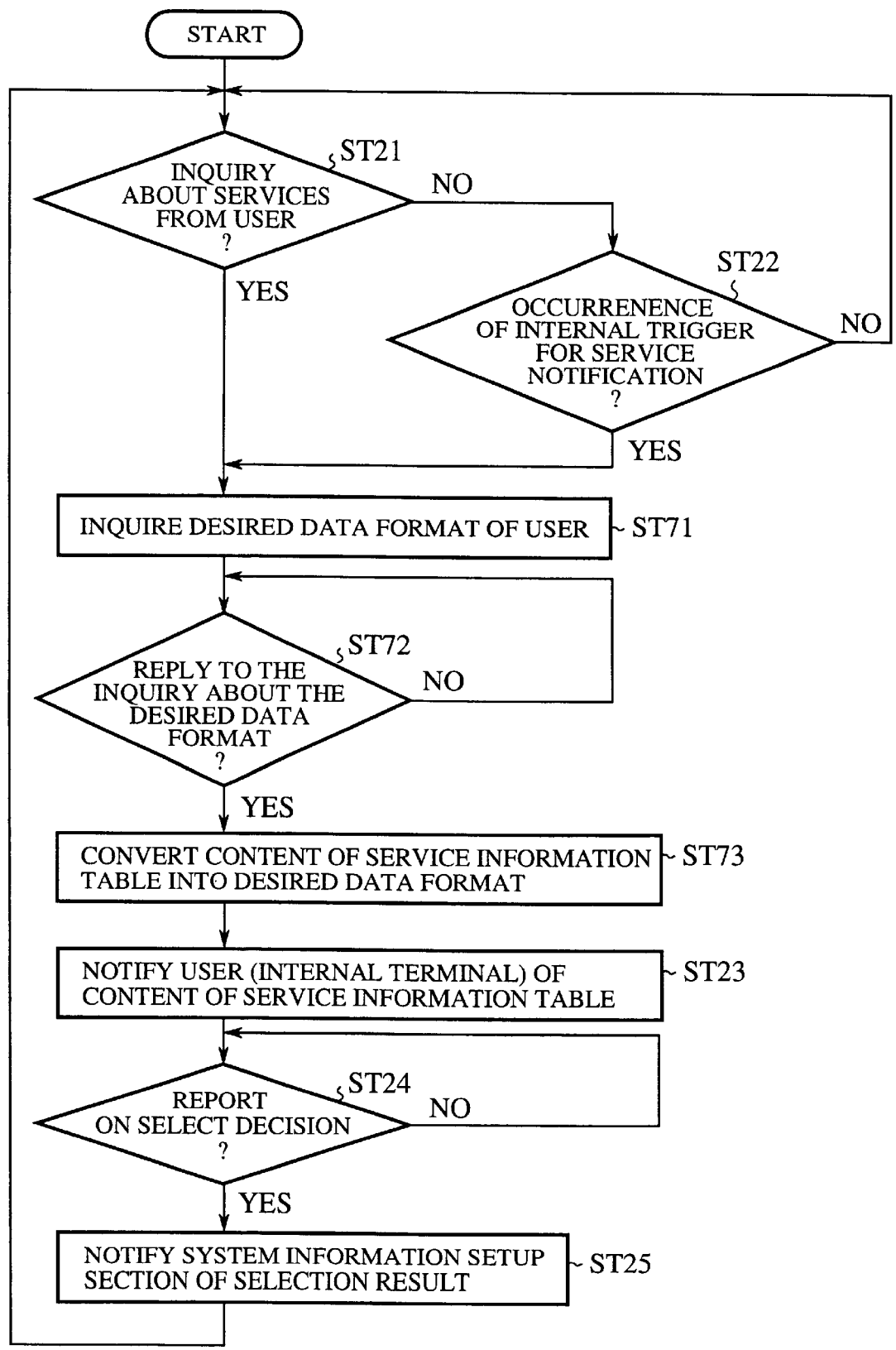
FIG. 13 is a flowchart illustrating a processing of the service presentation selector of an embodiment 4 of the data gateway unit in accordance with the present invention.
Figure 14:
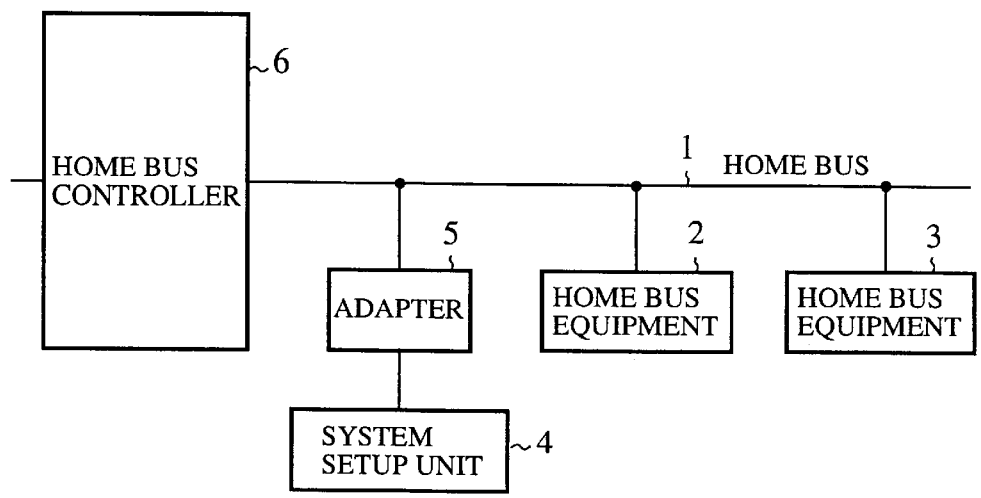
FIG. 14 is a block diagram showing a configuration of a home bus system to which a conventional data gateway unit (home bus controller) is connected.
Figure 15:
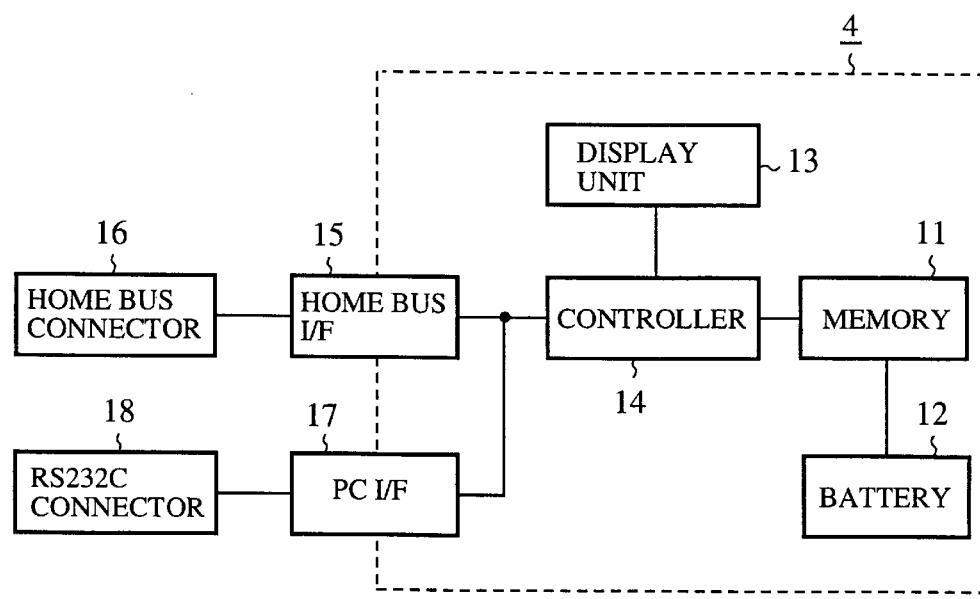
FIG. 15 is a block diagram showing an internal configuration of a system setup unit of FIG. 14.

FIG. 13 is a flowchart illustrating a processing of the service presentation selector 36 in the data gateway unit of the embodiment 4 in accordance with the present invention, in which the same reference symbols designate the same steps as in FIG. 8, and the description thereof is omitted here.

The start trigger of the service presentation selector 36 includes a service inquiry from users, and an internal trigger for notifying autonomously. In response to one of these start triggers, the service presentation selector 36 transmits to the user a message for inquiring about the data format the user desires (step ST71).

The data format here refers to a data description language such as HTML (Hypertext Markup Language), for example. Receiving the reply to the desired data format from the user (step ST72), the service presentation selector 36 converts the content of the service information table to the data format desired (step ST73).

After that, it sends the conversed data to the user (step ST23), and then notifies, when the user selects a service (step ST24), the system information setup section 37 about the selection result by the user (step ST25).

As described above, the present embodiment 4 is configured such that the service presentation selector 36 converts the content of the service information table to the data format the user desires, and notifies the internal terminal unit of the content. This can improve the man-machine interface for selecting a service on the internal terminal unit, offering an advantage of enabling the user to carry out the service selection with ease.

For example, the content of the service information table can be sent in a mixture of graphic data (like a block diagram showing a configuration of the customer premise network) described in the HTML rather than in the plain text data. This offers an advantage of enabling the user to grasp the content of the service intuitively in selecting the service.

What is claimed is:

1. A data gateway unit comprising:

configuration information update means for examining a connection state of a terminal on a customer premise network side, and for updating configuration information on the customer premise network;

service menu means for enumerating, in response to the configuration information on the customer premise network which said configuration update means updates, available services the terminal on the customer premise network side can implement;

service presentation and selection means for notifying a user of the available services said service menu means enumerates, and for accepting a service selected by the user;

wherein said service menu means looks at a service table to enumerate the available services the terminal on the customer premise network side can implement, the service table describing combinations of functional components for implementing particular services; and wherein said service menu means requests a service provider connected to a public network to send update data of the service table, and updates the service table in accordance with the update data sent from the service provider.

2. The data gateway unit according to claim 1, wherein said service menu means receives, when a service provider connected to a public network makes an inquiry about an update of the service table, update data of the service table from the service provider, and updates the service table in accordance with the update data.

3. The data gateway unit according to claim 1, wherein said service menu means receives, in response to an update request of the service table from a user, update data of the service table from a terminal connected to one of the customer premise network and a public network, and updates the service table in accordance with the update data.

4. The data gateway unit according to claim 1, wherein said service menu means further enumerates available services that can be implemented using a function of a terminal connected to a public network.

5. The data gateway unit according to claim 1, wherein said service presentation and selection means notifies the user of the available services enumerated by said service menu means in response to an inquiry about the available services from the user.

6. The data gateway unit according to claim 1, wherein said service presentation and selection means autonomously notifies a user of the available services said service menu means enumerates.

7. The data gateway unit according to claim 1, wherein said service presentation and selection means converts data on contents of the available services into a data format desired by the user when notifying the user of the available services.

8. A data gateway method comprising the steps of:

examining a connection state of a terminal on a customer premise network side, and updating configuration information on the customer premise network;

enumerating, in response to the configuration information on the customer premise network, available services the terminal on the customer premise network side can implement using a service table updatable by a service provider connected to a public network by sending update data for the service table, wherein the service table describes combinations of functional components for implementing particular services; and notifying a user of the available services, and accepting a service selected by the user.

9. A machine-readable medium having stored thereon a plurality of executable instructions, the plurality of instructions comprising instructions to:

examine a connection state of a terminal on a customer premise network side, and update configuration information on the customer premise network;

enumerate, in response to the configuration information on the customer premise network, available services the terminal on the customer premise network side can implement using a service table updatable by a service provider connected to a public network by sending update data for the service table, wherein the service table describes combinations of functional components for implementing particular services; and notify a user of the available services, and accept a service selected by the user.

* * * * *